(12) United States Patent
Yoon et al.

(10) Patent No.: US 12,463,292 B2
(45) Date of Patent: Nov. 4, 2025

(54) BATTERY MODULE AND BATTERY PACK INCLUDING THE SAME

(71) Applicant: LG Energy Solution, Ltd., Seoul (KR)

(72) Inventors: Han Ki Yoon, Daejeon (KR); Junyeob Seong, Daejeon (KR); Seung Ryul Baek, Daejeon (KR); Jonghwa Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 780 days.

(21) Appl. No.: 17/440,987

(22) PCT Filed: Apr. 22, 2020

(86) PCT No.: PCT/KR2020/005313
§ 371 (c)(1),
(2) Date: Sep. 20, 2021

(87) PCT Pub. No.: WO2020/256271
PCT Pub. Date: Dec. 24, 2020

(65) Prior Publication Data
US 2022/0173481 A1 Jun. 2, 2022

(30) Foreign Application Priority Data
Jun. 18, 2019 (KR) .......................... 10-2019-0072499

(51) Int. Cl.
*H01M 50/507* (2021.01)
*H01M 10/48* (2006.01)
(Continued)

(52) U.S. Cl.
CPC ....... *H01M 50/507* (2021.01); *H01M 10/486* (2013.01); *H01M 50/211* (2021.01);
(Continued)

(58) Field of Classification Search
CPC ............ H01M 50/507; H01M 50/211; H01M 50/284; H01M 50/298; H01M 50/569;
(Continued)

(56) References Cited

U.S. PATENT DOCUMENTS 7,611,798 B2   11/2009   Yoon et al.
2005/0206347 A1*  9/2005   Seo ........................... G01K 3/14
                                          374/E1.005

(Continued)

FOREIGN PATENT DOCUMENTS

CN   101164181 A   4/2008
CN   108463902 A   8/2018

(Continued)

OTHER PUBLICATIONS

English Translation of KR 20180078777 A- Hinge Structure of Battery Cell Module; Yura Corp Co LTD; Jul. 10, 2018 (Year: 2018).*

(Continued)

*Primary Examiner* — Adam J Francis
(74) *Attorney, Agent, or Firm* — Lerner David LLP (57) ABSTRACT

A battery module according to an exemplary embodiment of the present invention includes: a battery cell stacked body in which a plurality of battery cells are stacked; a U-shaped frame receiving the battery cell stacked body and having an opened upper part; an upper plate covering the battery cell stacked body on the opened upper part of the U-shaped frame; a bus bar frame respectively formed at both ends of the battery cell stacked body; a signal connection portion disposed between the upper plate and the battery cell stacked body and connecting the bus bar frames respectively formed at both ends of the battery cell stacked body; and a bridge (Continued)

adjacent to the signal connection portion and hinged to the bus bar frame, wherein a temperature sensor is attached to the bridge.

10 Claims, 7 Drawing Sheets

(51) Int. Cl.
  *H01M 50/211* (2021.01)
  *H01M 50/284* (2021.01)
  *H01M 50/298* (2021.01)
  *H01M 50/502* (2021.01)
  *H01M 50/569* (2021.01)

(52) U.S. Cl.
  CPC ....... *H01M 50/284* (2021.01); *H01M 50/298* (2021.01); *H01M 50/502* (2021.01); *H01M 50/569* (2021.01); *H01M 2220/20* (2013.01)

(58) Field of Classification Search
  CPC ............. H01M 50/502; H01M 50/105; H01M 10/486; H01M 10/48; H01M 10/0468; H01M 10/04; H01M 2220/20
  See application file for complete search history.

(56) References Cited

U.S. PATENT DOCUMENTS

| | | |
|---|---|---|
| 2009/0022206 A1 | 1/2009 | Shibuya et al. |
| 2014/0093642 A1 | 4/2014 | Cha et al. |
| 2015/0010808 A1 | 1/2015 | Shoji |
| 2016/0248070 A1* | 8/2016 | Ahn .................... H01M 50/209 |
| 2017/0093053 A1* | 3/2017 | Chang ................... H01M 50/50 |
| 2018/0006288 A1 | 1/2018 | Nakayama et al. |
| 2018/0337387 A1 | 11/2018 | Shoji et al. |
| 2019/0001838 A1 | 1/2019 | Choi et al. |
| 2019/0131596 A1 | 5/2019 | Yang et al. |
| 2019/0348720 A1 | 11/2019 | Oh et al. |
| 2019/0389318 A1* | 12/2019 | Lee .................... H01M 50/516 |
| 2020/0014005 A1 | 1/2020 | Lee et al. |
| 2020/0036049 A1 | 1/2020 | Lee et al. |
| 2020/0203782 A1 | 6/2020 | Yoon |
| 2022/0173481 A1 | 6/2022 | Yoon et al. |

FOREIGN PATENT DOCUMENTS

| | | | |
|---|---|---|---|
| CN | 212230496 U | | 12/2020 |
| JP | 2008209187 A | | 9/2008 |
| JP | 2015015091 A | | 1/2015 |
| JP | 2016134334 A | | 7/2016 |
| JP | 2019511810 A | | 4/2019 |
| KR | 20140095660 A | * | 8/2014 |
| KR | 101573224 B1 | | 12/2015 |
| KR | 20180038253 A | | 4/2018 |
| KR | 101872833 B1 | | 6/2018 |
| KR | 20180078777 A | * | 7/2018 |
| KR | 20180099438 A | * | 9/2018 |
| KR | 101928072 B1 | | 12/2018 |
| KR | 20190051297 A | | 5/2019 |
| KR | 20190061378 A | | 6/2019 |
| KR | 20190078521 A | * | 7/2019 |
| WO | 2016117419 A1 | | 7/2016 |
| WO | 2018124494 A2 | | 7/2018 |
| WO | 2019022407 A1 | | 1/2019 |
| WO | 2019088625 A1 | | 5/2019 |

OTHER PUBLICATIONS

English Translation of KR 20190078521 A- Battery module and its manufacturing method; SK Innovation Co Ltd; Jul. 4, 2019 (Year: 2019).*
International Search Report for PCT/KR2020/005313 dated Jul. 24, 2020. 3 pgs.
Extended European Search Report including Written Opinion for Application No. 20826721.1 dated Feb. 17, 2022, pp. 1-6.
Search Report dated May 24, 2022 from Office Action for Chinese Application No. 202010544437. 7 issued Jun. 1, 2022. 3 pgs. (see p. 2 categorizing the cited references).

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of PCT/KR2020/005313 filed on Apr. 22, 2020 and claims priority to and the benefit of Korean Patent Application No. 10-2019-0072499 filed in the Korean Intellectual Property Office on Jun. 18, 2019, the entire contents of which are incorporated herein by reference.

TECHNICAL FIELD

The present invention relates to a battery module and a battery pack including the same, and more particularly, to a battery module with an improved space utilization rate and a battery pack including the same.

BACKGROUND ART

Rechargeable batteries having high application characteristics and electrical characteristics such as high energy density according to their products are widely applied to battery vehicles, hybrid vehicles, and electric power storage devices driven by electric driving sources as well as portable devices. These rechargeable batteries are attracting attention as new energy sources for improving environmentally-friendliness and energy efficiency in that they do not generate any by-products of energy use as well as their primary merit, in which they can drastically reduce the use of fossil fuels.

In small mobile devices, one, or two, or three battery cells are used per device, while medium and large devices such as automobiles require high power/large capacity. Therefore, a medium-to-large battery module in which a plurality of battery cells are electrically connected is used.

Since it is preferable for medium and large battery modules to be manufactured with as small a size and weight as possible, a prismatic battery and a pouch-type battery, which may have a high integration degree and have a small weight with respect to capacity, are mainly used as a battery cell of the medium and large battery modules. Meanwhile, in order to protect the cell stacked body from external impact, heat, or vibration, the battery module may include a frame member that receives the battery cell stacked body in an internal space with front and rear openings.

Figure 1:
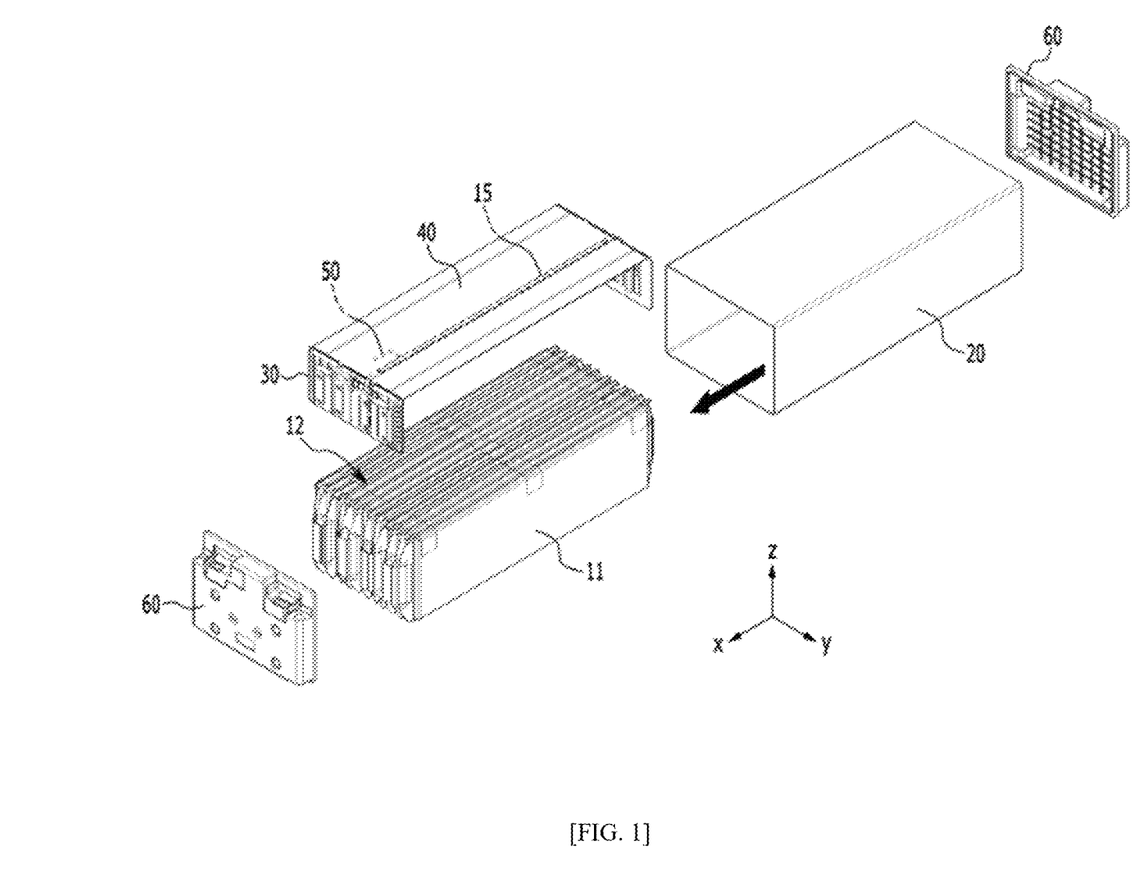
FIG. 1 is an exploded perspective view showing a battery module having a conventional monoframe.

FIG. 1 is a perspective view of a battery module having a conventional monoframe.

Referring to FIG. 1, a battery module may include a battery cell stacked body 12 formed by laminating a plurality of battery cells 11, a monoframe 20 of which a front surface and a rear surface are opened to cover the battery cell stacked body 12, a cover plate 40 covering the upper surface of the battery cell stacked body 12, a bus bar frame 30 covering the front surface and the rear surface of the battery cell stacked body 12, and an end plate 60 covering the front surface and the rear surface of the monoframe 20. Two bus bar frames 30 corresponding to each other may be connected by a cover plate 40. A temperature sensor 50 is attached to the cover plate 40.

In order to form such a battery module, as shown by an arrow in FIG. 1, horizontal assembly is required by inserting the battery cell stacked body 12 into the opened front or rear of the monoframe 20 along an X-axis direction. However, a sufficient clearance should be secured between the battery cell stacked body 12 and the monoframe 20 so that the horizontal assembly becomes stable. Here, the clearance refers to a gap caused by fitting. In addition, a flexible printed circuit 15 is formed between the cover plate 40 and the battery cell stacked body 12 to electrically connect the bus bar frames 30 at both ends, and a cover plate 40 may prevent the flexible printed circuit 15 from being damaged during the horizontal assembly.

However, due to the cover plate 40 provided in the flexible printed circuit 15, the height of the battery module may also be increased by its thickness, and the weight of the battery module may be increased.

When the size of the battery module increases as described above, when disposing the battery pack including the battery module under the vehicle, it may affect driving performance and fuel efficiency of the vehicle.

In addition, the height of the monoframe 20 should be largely designed in consideration of the maximum height of the battery cell stacked body 12 and the assemble clearance in the insertion process, and as a result, unnecessarily wasted space may occur.

The above information disclosed in this Background section is only for enhancement of understanding of the background of the invention, and therefore it may contain information that does not form the prior art that is already known in this country to a person of ordinary skill in the art.

DETAILED DESCRIPTION OF THE INVENTION

Technical Problem

The object to be solved by the present invention is to provide a battery module and a battery pack including the same that improve a space utilization rate by modifying the structure of a frame member surrounding the battery cell stacked body, and having a sensing connection member and a new temperature sensor attachment method with a more compact and simple structure to maximize the merit of this new structure.

However, the objective of the present invention is not limited to the aforementioned one, and may be extended in various ways within the spirit and scope of the present invention.

Technical Solution

A battery module according to an exemplary embodiment of the present invention includes: a battery cell stacked body in which a plurality of battery cells are stacked; a U-shaped frame receiving the battery cell stacked body and having an opened upper part; an upper plate covering the battery cell stacked body on the opened upper part of the U-shaped frame; a bus bar frame respectively formed at both ends of the battery cell stacked body; a signal connection portion disposed between the upper plate and the battery cell stacked body and connecting bus bar frames respectively formed at both ends of the battery cell stacked body; and a bridge adjacent to the signal connection portion and hinged to the bus bar frame, wherein a temperature sensor is attached to the bridge.

The bridge may have a rotation axis.

The battery module may further include a compression pad disposed between the bridge and the battery cell stacked body.

The battery module may further include a double-sided adhesive tape disposed between the compression pad and the battery cell stacked body.

The temperature sensor may be a thermistor device.

A surface of the battery cell stacked body perpendicular to the lamination direction of the plurality of battery cells may be mounted to a bottom part of the U-shaped frame.

The battery module may further include end plates respectively coupled to both opened sides of the U-shaped frame, and both of the opened sides of the U-shaped frame may face each other based on a direction in which an electrode lead of the battery cell stacked body is protruded.

The U-shaped frame may include a bottom part and two side parts facing each other while being connected by the bottom part, and a distance between the two side parts may be the same as a width of the upper plate.

The signal connection portion may be formed of a flexible flat cable (FFC), and may connect the bus bar frames of both ends of the battery cell stacked body.

A battery pack according another exemplary embodiment of the present invention includes the above-described battery module.

Advantageous Effects

According to exemplary embodiments, a space utilization rate may be improved by implementing the U-shaped frame to reduce a tolerance between the battery cell stacked body and the frame in comparison with conventional art.

In addition, in order to maximize the merit of the U-shaped frame structure, the cover plate is removed, and an assemble interference may be minimized by attaching the temperature sensor to the temperature sensor bridge, and the temperature sensor may be fixed at a constant position.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, portions that are not directly related to the present invention are omitted, and the same reference numerals are attached to the same or similar constituent elements through the entire specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

Figure 2:
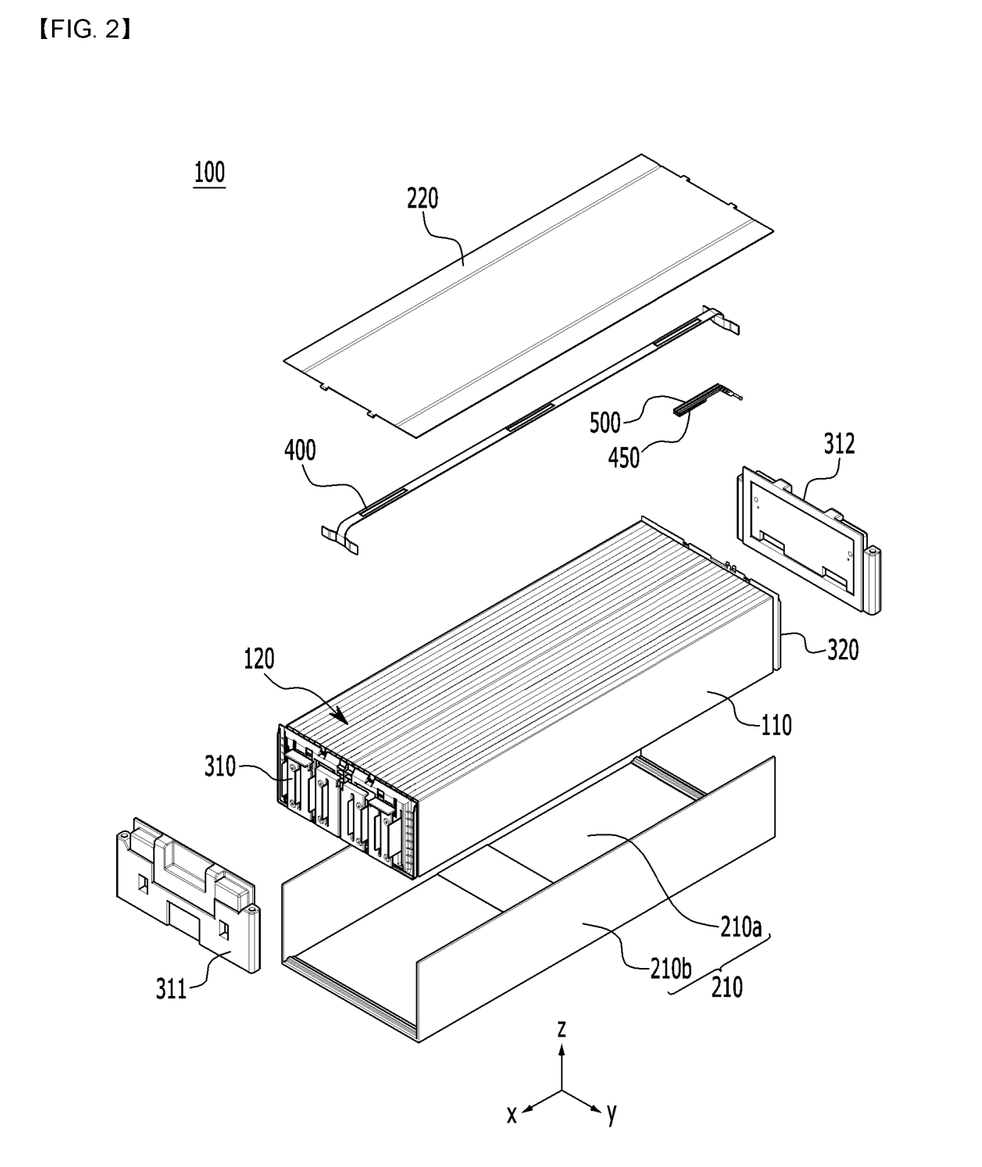
FIG. 2 is an exploded perspective view showing a battery module according to an exemplary embodiment of the present invention.
Figure 3:
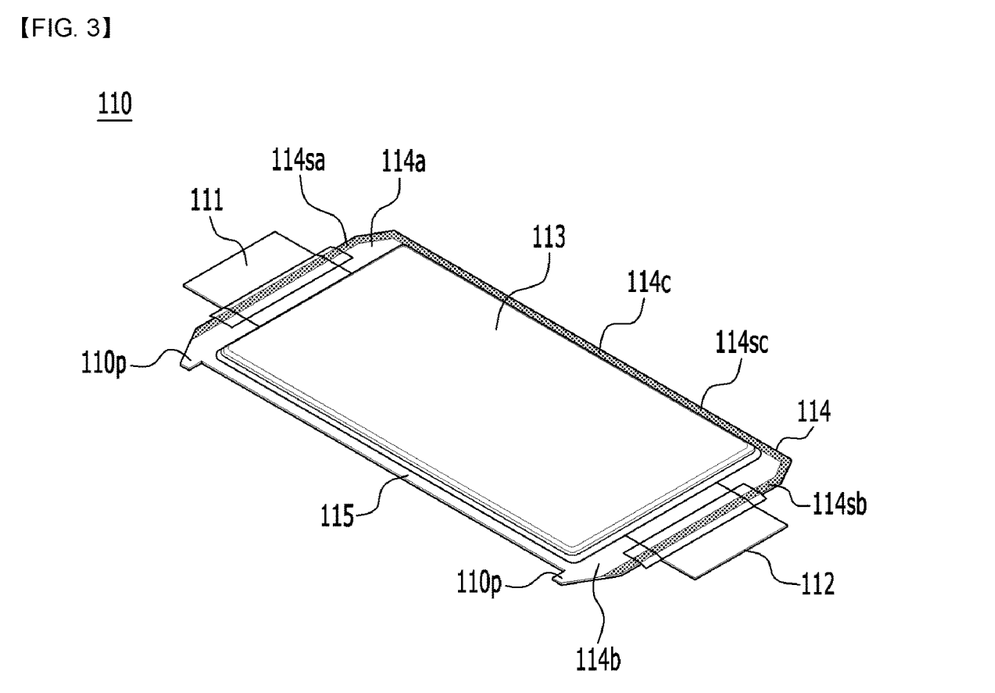
FIG. 3 is a perspective view of a pouch-type battery according to an exemplary embodiment of the present invention.

FIG. 2 is an exploded perspective view showing a battery module according to an exemplary embodiment of the present invention. FIG. 3 is a perspective view of a pouch-type battery according to an exemplary embodiment of the present invention.

Referring to FIG. 2, a battery module 100 according to the present exemplary embodiment includes a battery cell stacked body 120 including a plurality of battery cells 110, a U-shaped frame 210 of which an upper surface, a front surface, and a rear surface are opened, an upper plate 220 covering an upper part of the battery cell stacked body 120, end plates 311 and 312 respectively disposed at the front and rear of the battery cell stacked body 120, and bus bar frames 310 and 320 disposed between the battery cell stacked body 120 and the end plates 311 and 312.

When the opened sides of the U-shaped frame 210 are referred to as a first side and a second side, respectively, the U-shaped frame 210 is formed of a plate-shaped structure that is bent to continuously surround the front, top, and rear surfaces adjacent to each other among the other outer surfaces except for the surfaces of the battery cell stacked body 120 corresponding to the first side and the second side.

The upper plate 220 is composed of one plate-shaped structure surrounding the bottom surface excluding the front, top, and back surfaces covered by the U-shaped frame 210 among the other outer surfaces excluding the front and rear surfaces of the battery cell stacked body 120. The U-shaped frame 210 includes a bottom part 300a and two side parts 300b facing each other. As the U-shaped frame 210 and the upper plate 220 are combined by welding and the like in a state that edge parts corresponding to each other are in contact, thereby forming the structure surrounding the battery cell stacked body 120. That is, the U-shaped frame 210 and the upper plate 220 may be combined by welding or the like at the corner portions corresponding to each other.

The battery cell stacked body 120 may include a plurality of battery cells 110 stacked in one direction, and the plurality of battery cells 110 may be stacked in a Y-axis direction as shown in FIG. 2. The battery cell 110 is preferably a pouch-type battery cell. For example, referring to FIG. 3, the battery cell 110 according to the present exemplary embodiment has a structure in which two electrode leads 111 and 112 corresponding to each other are respectively protruded from one end 114a and another end 114b of a battery main body 113. The battery cell 110 may be manufactured by adhering both ends 114a and 114b of the battery case 114 and one side portion 114c connecting them in a state in which an electrode assembly (not shown) is received in a battery case 114. In other words, the battery cell 110 according to the present exemplary embodiment has a total of three sealing portions 114sa, 114sb, and 114sc, and the sealing portions 114sa, 114sb, and 114sc are sealed by a method such as heat fusion, while the remaining one side portion may be formed of a connection portion 115. The length direction of the battery cell 110 is defined between both ends 114a and 114b of the battery case 114, and the width direction of the battery cell 110 may be defined between the one side portion 114c connecting both ends 114a and 114b of the battery case 114 and the connection portion 115.

The connection portion 115 is an area that extends along a border of the battery cell 110, and a protruded portion 110p of the battery cell 110 may be formed at the end of the connection portion 115. The protruded portion 110p may be formed on at least one of both ends of the connection portion 115, and may be protruded in the direction perpendicular to the extending direction of the connection portion 115. The protruded portion 110p may be disposed between one of the sealing portions 114sa and 114sb of both ends 114a and 114b of the battery case 114 and the connection portion 115.

The battery case 114 is generally composed of a laminate structure of a resin layer/a metal thin membrane layer/a resin layer. For example, in the case that the battery case surface is formed of an O (oriented)-nylon layer, when laminating the plurality of battery cells to form the battery module, the plurality of battery cells tend to slide easily by an external impact. Therefore, in order to prevent this and maintain the stable laminate structure of the battery cells, an adhesion member such as a viscous adhesive of a double-sided adhesive tape or a chemical adhesive bonded by a chemical reaction upon adhesion may be attached to the surface of the battery case to form the battery cell stacked body 120. In the present exemplary embodiment, the battery cell stacked body 120 may be stacked in the Y-axis direction and received in a U-shaped frame 300 in the Z-axis direction, and then cooling may be performed by a thermally conductive resin layer (not shown) formed between the battery cell stacked body 120 and a bottom part 210a of the U-shaped frame 300. As a comparative example, the battery cell may be formed as a cartridge-type part and then fixing between the battery cells may be performed by assembling the battery module frame. In this comparative example, due to the presence of the cartridge-type part, there is little cooling or the cooling may proceed in the direction of the surface of the battery cell, and the cooling is not good in the height direction of the battery module.

Before the battery cell stacked body 120 according to the present exemplary embodiment is mounted to the bottom part 300a of the U-shaped frame 300, the thermally conductive resin may be coated on the bottom part 210a of the U-shaped frame 210 and the thermally conductive resin may be cured to form the thermally conductive resin layer.

Thereafter, the battery cell stacked body 120 may be mounted to the bottom part 210a of the U-shaped frame 210 while moving along the direction perpendicular to the bottom part 210a of the U-shaped frame 210. At this time, the thermally conductive resin layer is disposed between the bottom part 210a of the U-shaped frame 210 and the battery cell stacked body 120. The thermal conductive resin layer may serve to transfer heat generated from the battery cell 110 to the bottom of the battery module 100 and fix the battery cell stacked body 120.

The widths of a side part 210b of the U-shaped frame 210 and the upper plate 220 according to the present exemplary embodiment may be the same. In other words, the corner portion along the X-axis direction of the upper plate 220 and the edge portion along the X-axis direction of the side part 210b of the U-shaped frame 210 may directly meet and be combined by a method such as welding.

The battery module 100 according to the present exemplary embodiment includes a signal connection portion 400 connecting bus bar frames 310 and 320 respectively formed at both ends of the battery cell stacked body 120, and a bridge 500 disposed adjacent to the signal connection portion 400. The bridge 500 is hinged to the bus bar frame 320, and a temperature sensor 450 is attached thereto. The signal connection portion 400 may be formed of a flexible flat cable (FFC).

Conventionally, a flexible printed circuit (FPC) is provided between the bus bar frames, so that two bus bar frames are connected through the flexible printed circuit, and a cover plate to prevent damage to the flexible printed circuit is additionally installed at the top of the flexible printed circuit. The cover plate is a component that is separately added from a plate corresponding to the upper plate 220 according to the present exemplary embodiment. However, according to an exemplary embodiment of the present invention, the cover plate that protects and supports the flexible printed circuit is removed, and the bus bar frames 310 and 320 are connected by the flexible flat cable (FFC) that does not require a protecting member such as the cover plate instead of the flexible printed circuit. Since the method and structure that covers the battery cell stacked body 120 are formed due to the combination of the U-shaped frame 210 and the upper plate 220, even if a flexible flat cable is used without the conventional cover plate, the damage to the flexible flat cable during the assembly process may be prevented.

By connecting the two bus bar frames through the FFC in this way, the height of the battery module 100 may be reduced, thereby increasing the energy density of the battery module itself.

As described above, the signal connection portion 400 formed of the FFC according to an exemplary embodiment of the present invention is disposed between the upper plate 220 and the battery cell stacked body 120. More specifically, an insulating member (not shown) may be formed on the upper side of the battery cell stacked body 120, and the signal connection portion 400 may be disposed between the insulating member (not shown) and the upper plate 220.

The signal connection portion 400 may be formed of a flexible cable to be bent, and the circuit for electrical connection between the bus bar frames is inserted inside the cable, so it is easy to cope with external impacts.

Figure 4:
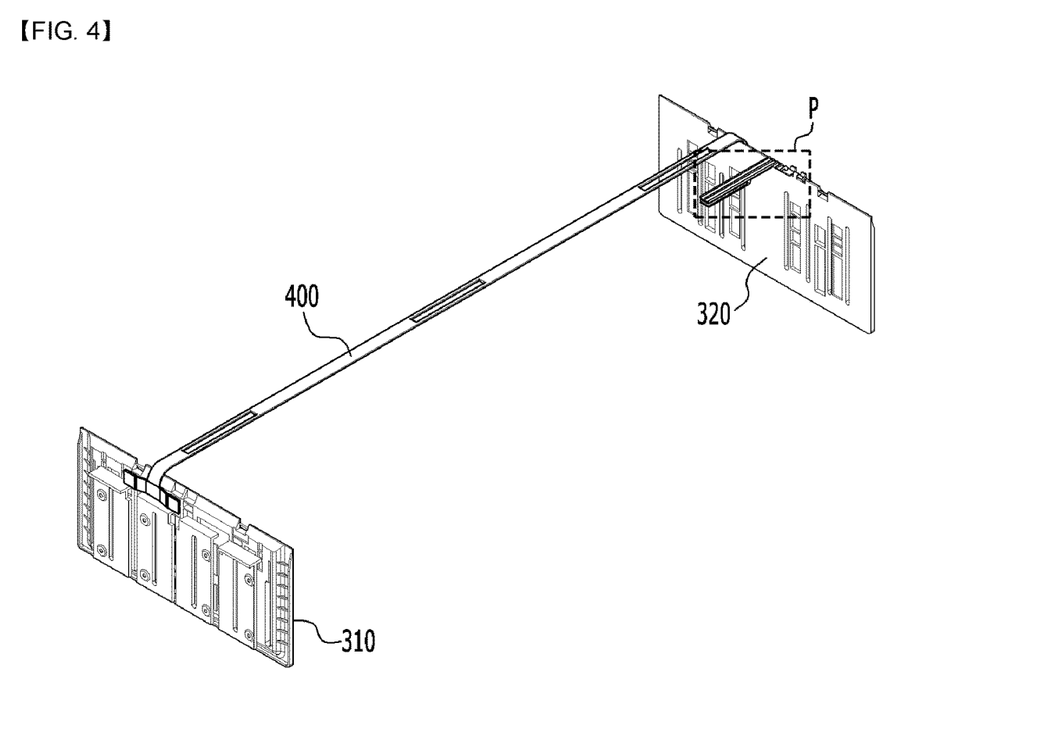
FIG. 4 is a view showing a shape in which a signal connection portion and a bridge are coupled to a bus bar frame in a battery module of FIG. 2.
Figure 5:
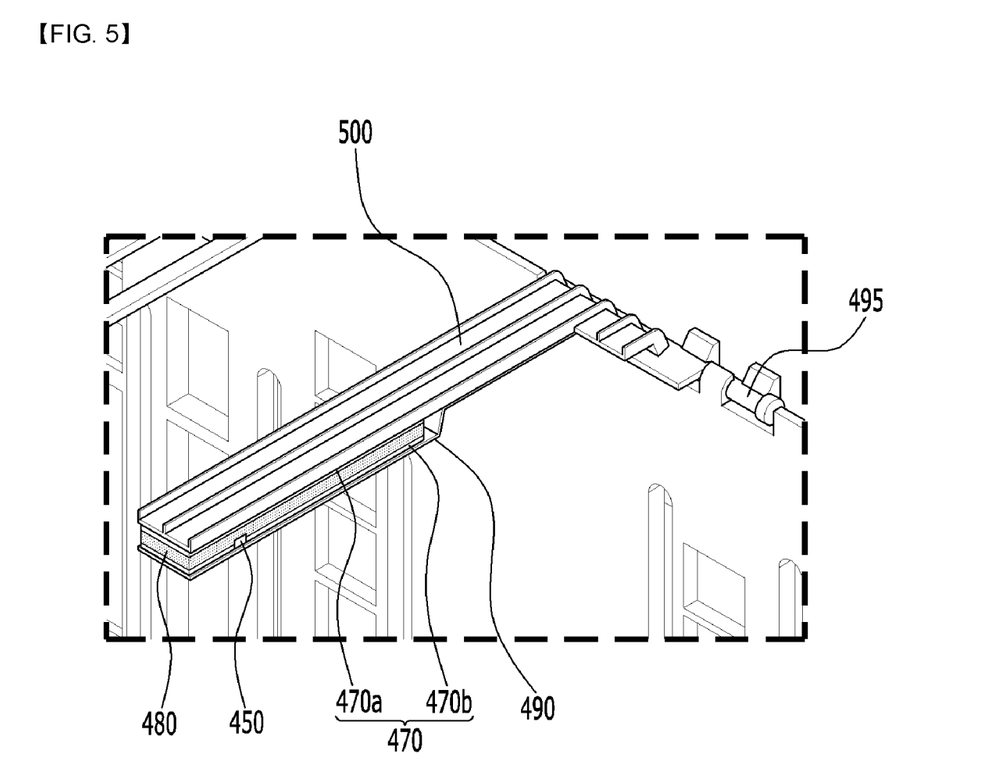
FIG. 5 is an enlarged view of a part P of FIG. 4.
Figure 6:
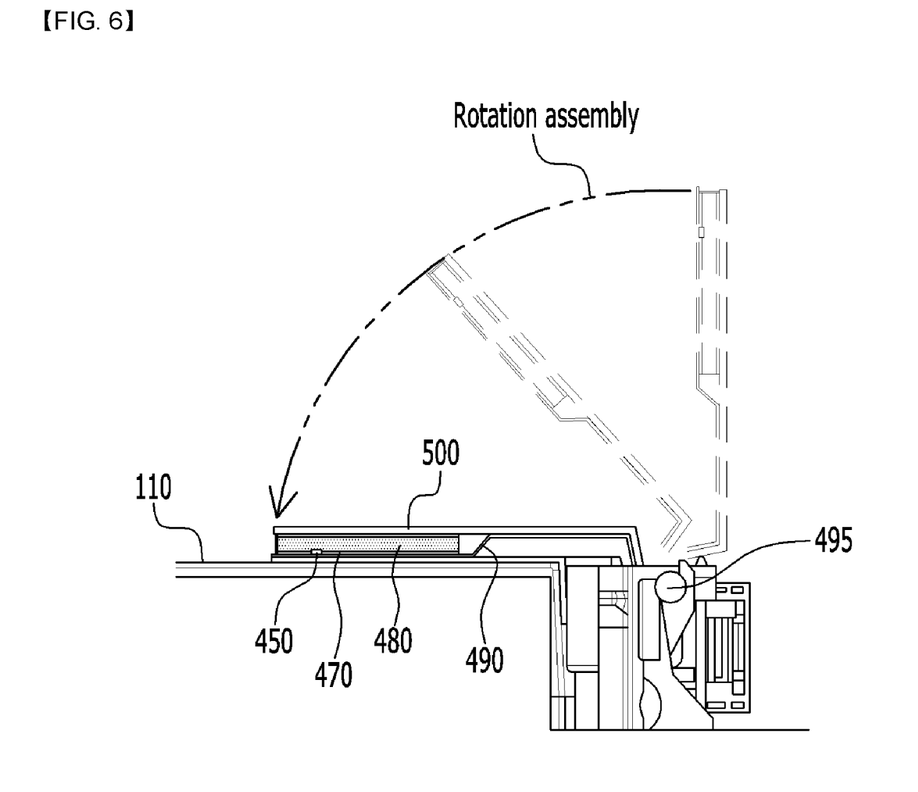
FIG. 6 is a side view showing FIG. 5 from one side.

Next, the temperature sensor according to an exemplary embodiment of the present invention is descried with reference to FIG. 4 to FIG. 6.

FIG. 4 is a view showing a shape in which a signal connection portion and a bridge are coupled to a bus bar frame in a battery module of FIG. 2. FIG. 5 is an enlarged view of a part P of FIG. 4. FIG. 6 is a side view showing FIG. 5 from one side.

Referring to FIG. 4 and FIG. 5, the temperature sensor 450 according to the present exemplary embodiment is attached to the bridge 500. The bridge 500 rotates on a rotation axis 495 so that the temperature sensor 450 may also rotate. The temperature sensor 450 according to the present exemplary embodiment may be formed of a thermistor device. The thermistor device is a semiconductor device that uses a phenomenon in which a resistance varies depending on temperature, and can be formed by mixing and sintering oxides such as copper, manganese, nickel, cobalt, chromium, and iron. This thermistor has a merit that its size is small and may measure temperature even a rapid temperature change or a minute temperature change.

The temperature information measured by the temperature sensor 450 may be transmitted to other devices outside the battery module. For example, when the temperature is measured by the temperature sensor 450, the measured temperature information may be transmitted to a battery management system (BMS) outside the battery module to be used to control the battery module. To this end, the battery module may include a temperature measuring cable (not shown) of which one end is connected to the temperature sensor 450. A connector may be provided at the other end of the cable, and the connector may be connected to an external device such as a BMS.

Referring to FIG. 5 and FIG. 6, the temperature sensor 450 according to the present exemplary embodiment may be disposed on a flexible printed circuit board 490. A compression pad 480 may be formed on the flexible printed circuit board 490. The compression pad 480 may be formed of polyurethane foam. If the compression pad 480 is added, the durability of the bridge 500 may be improved. The compression pad 480 may be combined with the bridge 500 by a first adhesive layer 470a and may be combined with the flexible printed circuit board 490 by a second adhesive layer 470b. An adhesive layer 470 including the first adhesive layer 470a and the second adhesive layer 470b may be a double-sided adhesive tape. The flexible printed circuit board 490 is partly connected to the temperature sensor 450 to transmit the sensed temperature information to the BMS outside the battery module. The temperature sensor 450 according to the present exemplary embodiment is disposed adjacent to the battery cell 110 according to the rotation of the bridge 500, so that the temperature according to the heat generated in the battery cell 110 may be detected.

Figure 7:
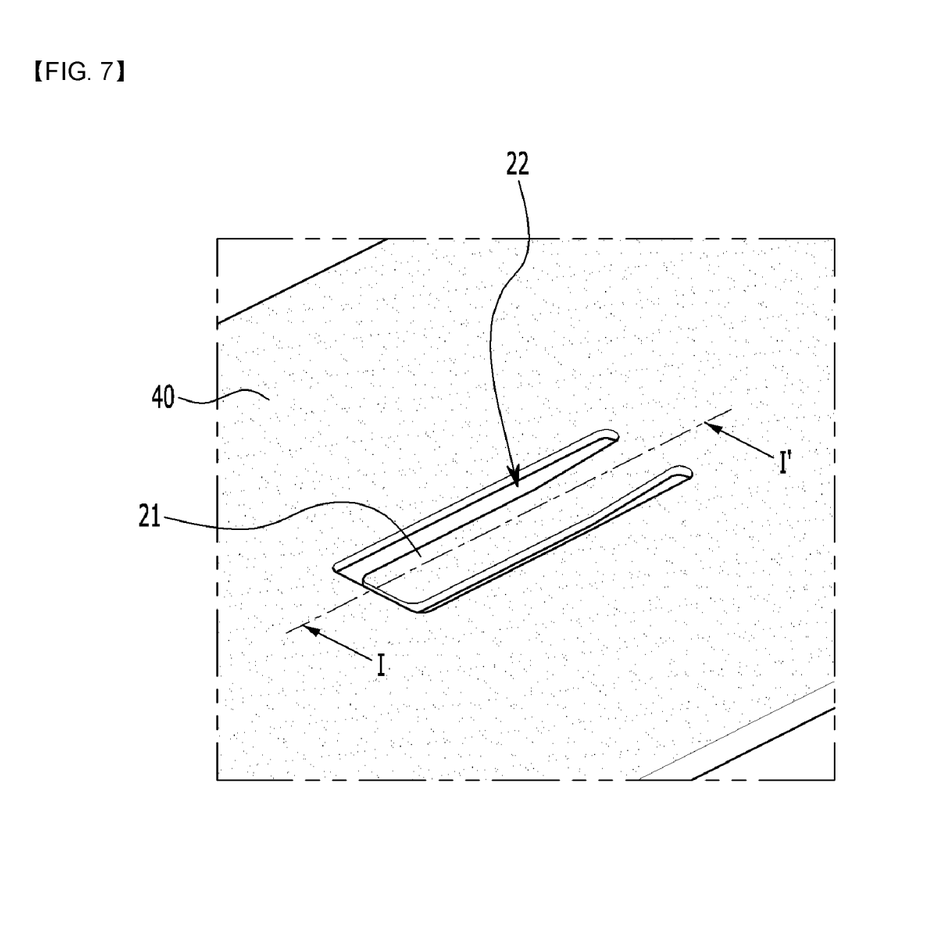
FIG. 7 is an enlarged view of a part of FIG. 1.
Figure 8:
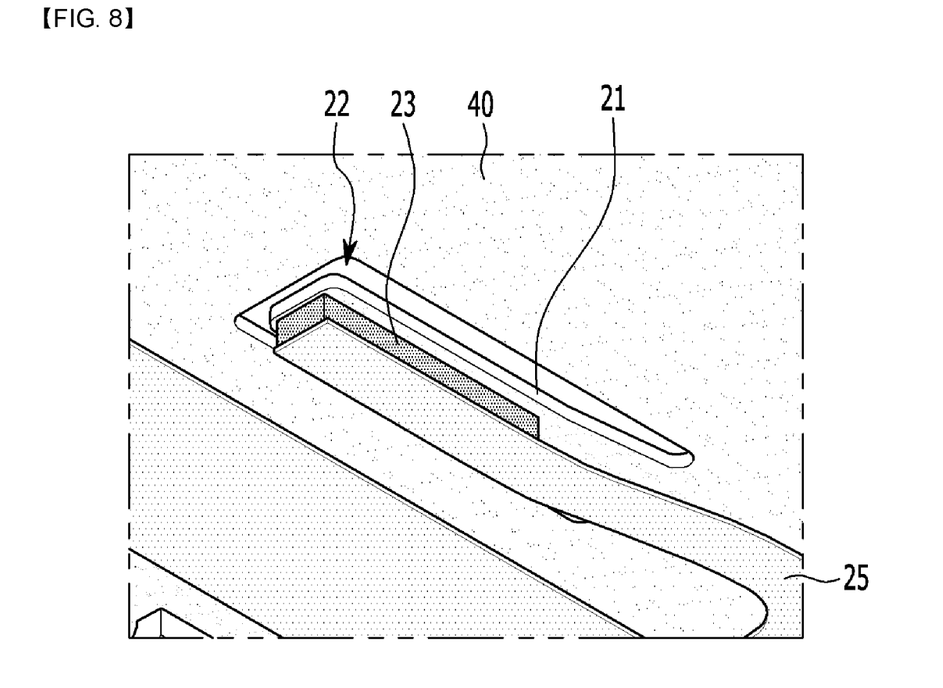
FIG. 8 is a partial view partially showing an inside of a part of FIG. 1.
Figure 9:
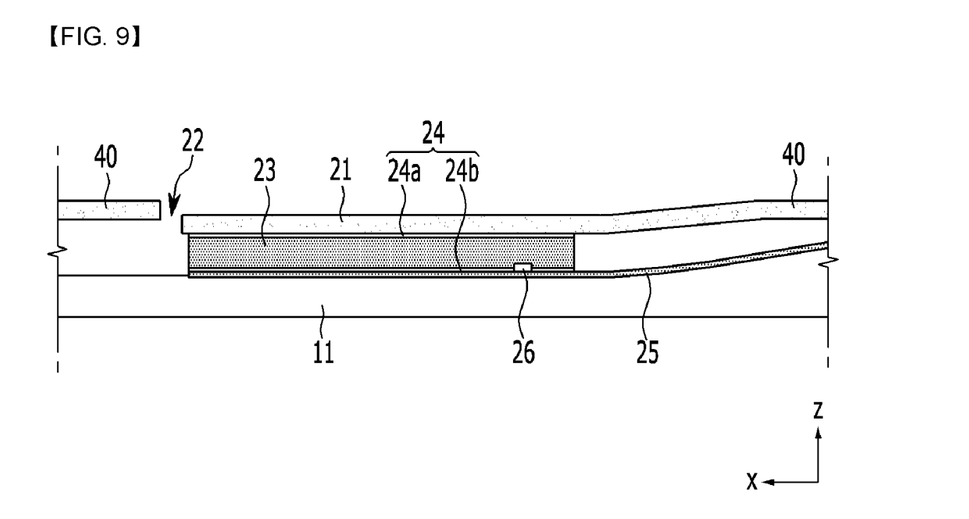
FIG. 9 is a cross-sectional view taken along a line I-I' of FIG. 7.

FIG. 7 is an enlarged view of a part of FIG. 1. FIG. 8 is a partial view partially showing an inside of a part of FIG. 1. FIG. 9 is a cross-sectional view taken along a line I-I' of FIG. 7. FIG. 7 to FIG. 9 are used to explain the temperature sensor according to a comparative example.

Referring to FIG. 7 to FIG. 9, a part of the cover plate 40 of FIG. 1 is cut to form an opening 22 and an elastic member 21. A flexible printed circuit board 25 is disposed at the lower end of the elastic member 21. One end of the flexible printed circuit board 25 is formed along the direction in which the elastic member 21 extends, and most of the elastic member 21 may overlap the flexible printed circuit board 25. A compression pad 23 is disposed between the elastic member 21 and one end of the flexible printed circuit board 25. An adhesive layer 24 is respectively formed at the upper surface and the bottom surface of the compression pad 23, and in detail, a first adhesive layer 24a is disposed between the compression pad 23 and the elastic member 21 and a second adhesive layer 24b is disposed between the compression pad 23 and the flexible printed circuit board 25. The first adhesive layer 24a and the second adhesive layer 24b are the double-sided adhesive tape. The flexible printed circuit board 25 may be bonded to the elastic member 21 by using the double-sided adhesive tape.

In the present comparative example, a temperature sensor 26 is mounted between the compression pad 23 and the battery cell 11. When the elastic member 21 is pressed, the temperature sensor 26 senses the temperature of the battery cell 11. In contrast, the temperature sensor 450 of FIG. 6 according to the present exemplary embodiment is attached to the bridge 500 rather than the cover plate and is assembled through the rotation axis 495, thereby minimizing assembly interference during the assembly process of the battery module of the U-shaped frame structure and being assembled at the position to sense the temperature of the battery cell without the cover plate. Therefore, according to the present exemplary embodiment, there is a merit in terms of the weight and space reduction and the cost reduction by eliminating the cover plate of the comparative example. Also, in the comparative example, since the temperature sensor 26 is assembled under the cover plate with the fixed state, it is difficult to check whether the temperature sensor 26 is in the right position, however the temperature sensor 450 according to the present exemplary embodiment is attached to the bridge 500 such that it is possible to confirm and adjust the position of the temperature sensor 450 before being assembled to the bus bar frame 320. In addition, in the process of inserting the monoframe 20 according to the comparative example into the battery cell stacked body 12, production defects due to a jamming of the cover plate may be reduced.

Meanwhile, one or more of the battery modules according to an exemplary embodiment of the present invention may be packaged in a pack case to form a battery pack.

The aforementioned battery module and battery pack including the same may be applied to various devices. The device may be applied to a vehicle such as an electric bicycle, an electric vehicle, or a hybrid vehicle, but the present invention is not limited thereto, and may be applied to various devices that can use a battery module, and this is also included in the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

EXPLANATION OF SYMBOLS

100: battery module
200: upper plate
210: U-shaped frame
400: connection signal unit
450: temperature sensor
500: bridge

The invention claimed is:
1. A battery module comprising:
a battery cell stacked body in which a plurality of battery cells are stacked;
a module frame receiving the battery cell stacked body and having an opened upper part, the module frame having a bottom wall with two side walls extending therefrom;

an upper plate covering the battery cell stacked body on the opened upper part;

a bus bar frame respectively formed at both ends of the battery cell stacked body;

a signal connection portion disposed between the upper plate and the battery cell stacked body, the signal connection portion connecting the bus bar frames respectively formed at both ends of the battery cell stacked body; and a bridge adjacent to the signal connection portion and hinged to the bus bar frame by a hinge, the bridge being separate from the signal connection portion and being spaced apart from the signal connection portion, wherein a temperature sensor is attached to the bridge and separated from the signal connection portion, the temperature sensor configured to rotate about a rotation axis of the hinge.

2. The battery module of claim 1, wherein the bridge has a rotation axis.

3. The battery module of claim 2, further comprising a compression pad disposed between the bridge and the battery cell stacked body.

4. The battery module of claim 3, further comprising a double-sided adhesive tape disposed between the compression pad and the battery cell stacked body.

5. The battery module of claim 4, wherein the temperature sensor is a thermistor device.

6. The battery module of claim 1, wherein a surface of the battery cell stacked body perpendicular to a lamination direction of the plurality of battery cells is mounted to a bottom part of the module frame.

7. The battery module of claim 6, further comprising end plates respectively coupled to both opened sides of the module frame, and wherein both of the opened sides of the module frame face each other based on a direction in which an electrode lead of the battery cell stacked body is protruded.

8. The battery module of claim 7, wherein the module frame includes two side parts facing each other while being connected by the bottom part, and a distance between the two side parts is the same as a width of the upper plate.

9. The battery module of claim 1, wherein the signal connection portion is formed of a flexible flat cable (FFC), and connects the bus bar frames of both ends of the battery cell stacked body.

10. A battery pack including a battery module of claim 1.

* * * * *